United States Patent Office 3,454,547
Patented July 8, 1969

3,454,547
PROCESS FOR THE PREPARATION OF POLYMERIZATION CATALYSTS
Andre Delbouille, Brussels, and Rene Speltinckx, Etterbeek, Belgium, assignors to Solvay & Cie, Brussels, Belgium
No Drawing. Filed May 2, 1966, Ser. No. 546,537
Claims priority, application France, June 25, 1965, 22,396
Int. Cl. B01j *11/64;* C08f *1/42*
U.S. Cl. 260—94.9          12 Claims

ABSTRACT OF THE DISCLOSURE

A polymerization catalyst useful for the polymerization of olefins is prepared by the reaction of a support of magnesium hydroxy chloride with a transition metal compound in the absence of an inert liquid diluent, by suspending the support in the liquid transition metal compound and thereby effecting the reaction in a liquid medium of the transition metal compound. A highly active polymerization catalyst is then obtained by activation of the reaction product with an organometallic compound.

---

The present invention relates to the preparation of catalysts for the polymerization of olefins. More particularly, it relates to the production of catalysts for the polymerization of olefins by activating with an organometallic compound the reaction product of a bivalent metal hydroxychloride with a transition metal compound.

The polymerization of olefins has in the past been effected by various types of catalysts. The present invention pertains to an improvement in one of the more effective of these prior catalysts. The use of the improved polymerization catalysts of the present invention gives increased yields of polymerization products of improved properties.

French Patent No. 1,375,127 describes a process for the polymerization and copolymerization of olefins in the presence of a catalyst obtained by activating with an organometallic compound, the reaction product of a transition metal compound and a solid support comprising a bivalent metal hydroxychloride. According to this patent, a bivalent metal hydroxychloride M, corresponding to the formula M(OH)Cl is used as a reaction support. This support is reacted with a transition metal compound, which results in the chemical fixation of the latter upon the support, by the action of the OH groups. If M' represents a transition metal and X a monovalent reactive group fixed on M', the reaction can be represented as follows:

$$X_nM' + M(OH)Cl \rightarrow X_{n-1}M'-OMCl + HX$$

According to the disclosure of the above patent, the above reaction was effected in the absence of humidity, by raising to boiling temperature a suspension of the hydroxychloride in a hydrocarbon such as hexane, xylene, or tetraline in which was dissolved a transition metal compound.

According to another method, usable in cases where the transition metal compound has a sufficiently high vapor tension, the transition metal compound is brought into contact with the hydroxychloride at a suitable temperature by means of a current of dry inert gas.

Both of the above methods produce very active catalysts. However, the process of the present invention enables the production of catalysts which are still more active.

According to the present invention, an improved solid catalyst for the polymerization of olefins is obtained by activating with an organometallic compound the reaction product of a transition metal compound and a suspension of the bivalent metal hydroxychloride in a liquid composed essentially of transition metal compound, brought to a temperature of between 80° and 180° C.

It has been noted that the simple fact of operating in the practically pure transition metal compound, in the liquid state, increases by at least five times the activity of the catalyst when used in the polymerization of olefins.

In addition, it has been found that if, after the chemical fixation, the solid catalyst obtained is extracted with a transition metal compound at a temperature of 80° to 180° C., the catalytic activity of the resulting catalyst is increased still more.

No perfectly satisfactory explanation has yet been found for what takes place during the chemical fixation, or for the exceptional activity of the catalysts produced by the above described operation.

However, certain experimental facts have been observed which suggest the following hypothesis.

The bivalent metal hydroxychlorides, and in particular magnesium hydroxychloride, which are used as reaction supports, are relatively difficult compounds to prepare and particularly to obtain in the completely anhydrous state.

From this fact, the hydroxychlorides used as the starting materials for the chemical fixation reaction can then contain, in spite of the best drying possible, a very small quantity of water. The latter, in the presence of transition metal compounds, can react as follows:

$$X_nM' + H_2O \rightarrow X_{n-2}M'O + 2HX$$

The compound $X_{n-2}M'O$ could be a catalyst poison, or simply an agent blocking certain active centers to substitute for them other less active centers.

Since the compound $X_{n-2}M'O$ is generally soluble in the compound $X_nM'$ at the temperature 80°–180° C., it can be supposed that it is partially dissolved in the latter when the fixation reaction is effected in the compound $X_nM'$ in the liquid state. The extraction treatment would eliminate the last traces of the undesired compound $X_{n-2}M'O$.

The transition metal compounds usable for the preparation of the catalysts are chosen from among those which contain groups X presenting a good reactivity toward the hydroxyl groups. Especially suitable for use are the halides, the halo-alkoxides and the alkoxides of the metals of Groups IV*b*, V*b* and VI*b* of the Periodic Table and, more particularly, the derivatives of titanium, and vanadium; for example, $TiCl_4$, $Ti(OC_2H_5)_4$, $Ti(OC_2H_5)_3Cl$, $VOCl_3$ and $VCl_4$.

Among the reaction supports comprising the bivalent metal hydroxychlorides, the use of magnesium hydroxychloride is preferred.

The reaction between magnesium hydroxychloride and titanium tetrachloride can be illustrated by the following equation:

$$TiCl_4 + Mg(OH)Cl \rightarrow Cl_3TiOMgCl + HCl$$

In this case, the secondary reaction due to the presence of traces of residuary water could be represented by the following equation:

$$TiCl_4 + H_2O \rightarrow TiOCl_2 + 2HCl$$

It has been possible to verify the presence of $TiOCl_2$ in polymerization reactions in only negligible quantities in proportion to the catalysts which are the subject of the present invention, and that the products obtained with $TiOCl_2$ as a constituent of the catalysts present at the same time unfavorable characteristics, and especially a molecular weight which is much too high.

These observations reinforce the hypothesis set out above and show the technical interest of the invention.

It will be noted in addition that it is essential, for the reasons given above, that the reaction involving the fixation of the transition metal compound upon the reaction support, as well as all of the handling of the support before and after the fixation reaction, must be effected in the absence of moisture.

The operation can be effected very simply at the desired temperature, that is to say, between 80° and 180° C., by adding a suspension of the hydroxychloride to a transition metal compound, maintained in the liquid state.

It is then possible to extract the product obtained by the transition metal compound by bringing this product in contact with a series of fresh charges of this compound, at the desired temperature. It is also possible to operate in a continuous extractor of the Soxlet or Kumagawa type.

With a good number of transition metal compounds and particularly with $TiCl_4$, $VOCl_3$ and $VCl_4$, it is possible to work at atmospheric pressure, at approximately the boiling point of the compound.

It will be noted, and it was entirely unexpected, that the quantity of transition metal compound fixed upon the support is, in the process of the present invention, much lower than that fixed in the prior processes and that in spite of this fact, the activity of the catalysts, expressed in grams of polymer products per gram of hydroxychloride being reacted with the transition metal compound, is much higher.

The latter observation also supports the hypothesis advanced above, when it is remembered that, in the case of $TiCl_4$, for example, a part of the titanium resulting from the reaction with the support, according to the prior methods, was in fact $TiOCl_2$, which is only very slightly active in polymerization. This $TiOCl_2$ was not chemically fixed to the support but was not extracted from it by subsequent treatments on account of its insolubility in the solvents used.

After the completion of the fixation reaction and subsequent extraction treatment, the catalytic solid is treated to eliminate the remainder of the transition metal compound which has not been chemically fixed upon the support. This treatment can be effected by washing by means of a solvent such as hexane, or by evaporation, preferably under reduced pressure, or by aerating with an inert gas.

The catalytic solids thus obtained are then activated by being brought into contact with an organometallic compound selected from the organic derivatives of the metals of Groups I, II, III, and IV of the Periodic Table, and, in particular, with a trialkylaluminum or a halide of alkylaluminum. The activation can be effected immediately before the introduction of the monomers; it is also possible to permit the catalyst to stand for a longer or shorter period of time at ambient or at a higher temperature.

The catalysts thus obtained are suitable for the polymerization of olefins and the copolymerization of olefins with each other and with nonconjugated diolefins.

Applied to the polymerization of ethylene, the catalyst prepared in accordance with the procedure which is the object of the present invention give, all operating conditions being equal, products having lower molecular weights as well as a closer distribution of molecular weight, as compared to the products obtained by means of catalysts prepared in accordance with prior processes.

The examples which follow will serve to illustrate the process of the present invention. It will be readily apparent, however, that variations of the specific procedures described will be obvious to one skilled in the art. Any such variations, however, which do not depart from the basic concept of the invention set forth above are intended to come within the scope of the appended claims.

EXAMPLES

Five samples of the same Mg(OH)Cl reaction support which had been submitted to different fixation treatments with $TiCl_4$, were used to polymerize ethylene under identical reaction conditions.

Experiments 1 and 2 below show the results obtained when operating according to methods different from those which are the object of the present invention and are given for purposes of comparison.

Experiments 3 to 5, although not limiting, show different methods for preparation of catalytic solids which are the object of the present invention.

The characteristics of the catalytic solids and the properties of the polyethylene obtained by their use are shown in the table which follows and which summarizes the details of the method of operation given below.

A. Preparation of a reaction support using Mg(OH)Cl 86 grams of pure $MgCl_2$, $6H_2O$ were dried at approximately 80° C. and the temperature of the solid then raised progressively to 285° C. The material was then maintained at this temperature for approximately 3 hours in contact with a current of warm air saturated with water at ambient temperature. The product thus obtained was finally dried for 2 hours at 285° C. with a current of dry air. The percent conversion to Mg(OH)Cl was 98%.

B. Preparation of the catalytic solids

Five tests of $TiCl_4$ fixation were treated in the manner described below:

EXAMPLE 1

5.4 grams of Mg(OK)Cl, prepared as above described, were suspended in 10 ml. of hexane containing 950 mgr. of dissolved $TiCl_4$ this mixture was brought to boiling and heated under reflux for 1 hour. The solid which separated was then washed with fresh hexane until complete disappearance of $Cl^-$ ions in the washing liquid. The product thus obtained was used in the first polymerization experiment.

EXAMPLE 2

30 gm. of Mg(OH)Cl were transferred to a cylindrical receiver having a conical bottom and heated therein to 150° C. Through the lower part of the cone was then injected air which had been bubbled through $TiCl_4$ and which contained 25 mgm./l. of $TiCl_4$ vapor. After 1 hour, the injection of gas was stopped, the solid recovered and used in polymerization experiment No. 2.

EXAMPLE 3

5 gm. of Mg(OH)Cl were suspended in 25 ml. of $TiCl_4$. The temperature of the resulting suspension was raised to 130° C. and agitated for 1 hour. The suspension was then allowed to cool and the solid recovered by decantation. The solid was then washed with hexane until all trace of $TiCl_4$ not chemically fixed was removed. The product thus obtained was used in polymerization experiment No. 3.

EXAMPLE 4

In this experiment, the operation was carried out as described in Example 3, with the exception that after reacting for 1 hour the solid was transferred into the basket of a Kumagawa type extractor and extracted therein for 1 hour with boiling $TiCl_4$. The resulting solid was then washed with hexane as in Example 3. The washed product thus obtained was used in polymerization experiment No. 4.

EXAMPLE 5

The operation in this experiment was carried out exactly as described in Example 4, with the exception that instead of washing with hexane, the excess of $TiCl_4$ was removed by heating the product to 150° C. in a current of dry nitrogen. The product thus obtained was used in polymerization experiment No. 5.

C. Polymerization

All of the polymerization experiments were carried out under identical conditions in the following manner:

A given quantity of the catalytic solid which had reacted with $TiCl_4$ was suspended in 1 liter of hexane in a 3 liter stainless steel autoclave. To this suspension was then added 572 mgm. of triisobutylaluminum dissolved in hexane. The temperature of the autoclave was then raised to 90° C. and ethylene and hydrogen introduced, the partial pressures of both gases being 10 kgm./cm.$^2$. After 2 hours reaction at constant pressure maintained by the continuous addition of ethylene, the autoclave pressure was released and the polyethylene recovered. The results obtained in the different experiments are shown in the following Table.

TABLE

| Experiment No | 1 | 2 | 3 | 4 | 5 |
|---|---|---|---|---|---|
| Amount of Ti fixed on support, mgm./gm | 22 | 40 | 17 | 12 | 12 |
| Amount of impregnated support used, mgm | 230 | 125 | 300 | 415 | 415 |
| Amount of polyethylene obtained, gm | 126.5 | 31 | 250 | 622 | 580 |
| Productivity, gm. PLT/gm. support | 550 | 248 | 835 | 1,500 | 1,400 |
| Molecular weight of PLT | 37,000 | 46,000 | 36,000 | 29,000 | 30,000 |

Examination of the table shows that the new technique for the preparation of catalytic solids gives catalysts of both increased catalytic activity and reduced titanium content.

The polyethylenes show low ash content and in particular reduced titanium content, which permits a decided reduction in purification operations, and in most cases makes the latter unnecessary.

It will be noted also that the polyethylenes obtained with the catalyst prepared in accordance with the present invention have lower molecular weights and are more readily used. These polyethylenes in addition show a narrower range of molecular weights.

Advantages of the same kind have been noted in carrying out the polymerization of propylene and the copolymerization of ethylene and propylene by means of catalysts produced in accordance with the process of the present invention.

What is claimed is:

1. In a process for preparing a polymerization catalyst in which a solid support of magnesium hydroxychloride is reacted with a transition metal compound selected from the group consisting of halides, haloalkoxides and alkoxides of metals of Groups IV–B, V–B and VI–B of the Periodic Table and the thus-obtained product is activated with an organometallic compound selected from the group consisting of metal alkyls and metal alkyl halides of a metal of Groups I, II, III and IV of the Periodic Table the improvement which comprises effecting the reaction between said transition metal compound and said solid support in the absence of an inert liquid diluent, in a liquid medium consisting essentially of said transition metal compound, said solid support being suspended in said liquid, transition metal compound at a temperature maintained at 80–180° C. under anhydrous conditions.

2. The process of claim 1 wherein after the said reaction between said magnesium hydroxychloride and the transition metal compound the resulting solid reaction product is subjected to extraction with the transition metal compound at a temperature between 80° and 180° C.

3. The process of claim 1 wherein the solid reaction product of the reaction between said magnesium hydroxychloride and said transition metal compound is washed with an inert organic solvent until any excess of said transition metal compound is removed.

4. The process of claim 1 wherein the reaction product of the reaction between said magnesium hydroxychloride and said transition metal compound is subjected to extraction with the transition metal compound at a temperature ranging from 80° to 180° C. and is subsequently washed with an inert organic solvent until any excess of said transition metal compound is removed.

5. The process of claim 1 wherein the reaction product of the reaction between said magnesium hydroxychloride and said transition metal compound is freed from residual transition metal compound by evaporation under reduced pressure.

6. The process of claim 1 wherein excess transition metal is removed from the reaction product of the reaction between said metal product and said transition metal compound by aerating said product with an inert gas.

7. The process of claim 1, wherein the reaction product of the reaction between the said magnesium hydroxychloride and said transition metal compound is subjected to extraction with said transition metal compound at temperatures between 80° and 180° C., and then any residiual transition metal compound is removed by evaporation.

8. The process of claim 1 wherein the said transition metal compound is selected from the group consisting of titanium tetrachloride, vanadium tetrachloride, and vanadium oxychloride.

9. A polymerization catalyst obtained according to the process of claim 1.

10. A process for the polymerization of olefins which comprises subjecting olefins to polymerization in the presence of a catalyst obtained according to the process of claim 1.

11. A process for the polymerization of an olefin selected from the group consisting of ethylene, propylene and mixtures thereof which comprises subjecting said olefin to polymerization in the presence of a catalyst obtained according to the process of claim 1.

12. A process for the polymerization of ethylene which comprises subjecting ethylene to polymerization in the presence of a catalyst obtained according to the process of claim 1.

References Cited

UNITED STATES PATENTS 3,400,110  9/1968  Dassesse et al.

FOREIGN PATENTS 1,375,127  8/1963  France.

PATRICK P. GARVIN, *Primary Examiner.*

U.S. Cl. X.R.

252—429, 431; 260—88.2, 93.7